Figure 1:
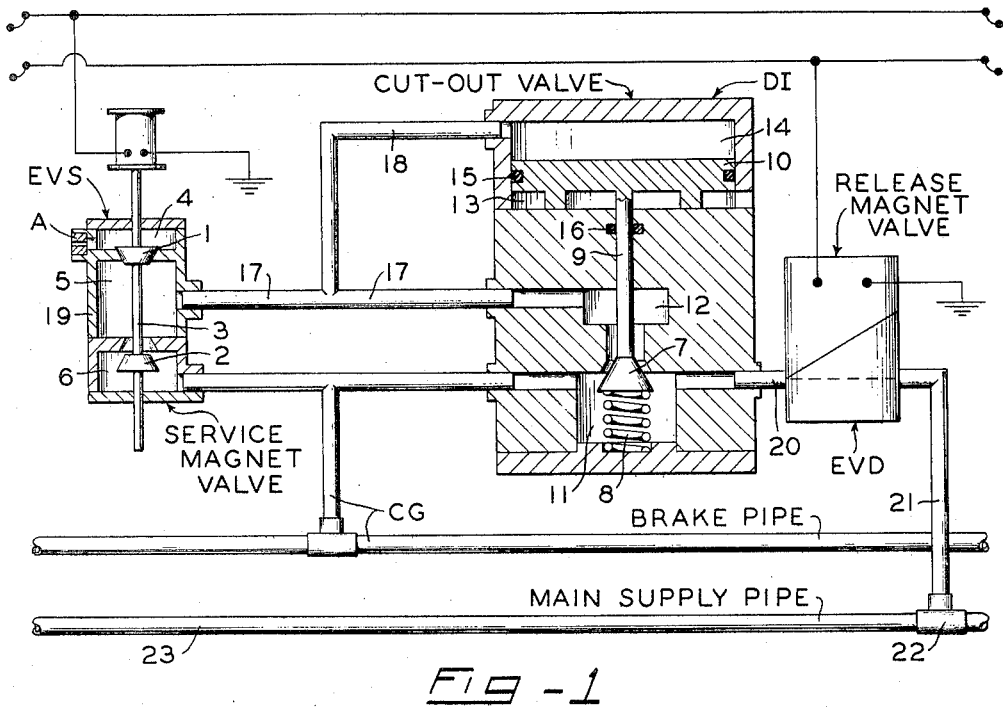

March 15, 1966 A. ROUILLON 3,240,536
COMBINED ELECTRO-PNEUMATIC AND PNEUMATIC BRAKE
SYSTEM FOR RAILWAY TRAINS
Filed April 22, 1964

INVENTOR.
ANDRÉ ROUILLON
BY
A. A. Steinmiller
ATTORNEY

United States Patent Office 3,240,536
Patented Mar. 15, 1966

3,240,536
COMBINED ELECTRO-PNEUMATIC AND PNEUMATIC BRAKE SYSTEM FOR RAILWAY TRAINS
André Rouillon, Villemomble, France, assignor to Compagnie des Freins et Signaux Westinghouse, Paris, France
Filed Apr. 22, 1964, Ser. No. 361,719
Claims priority, application France, May 30, 1963, 936,498
8 Claims. (Cl. 303—16)

The present invention relates to a two-pipe electro-pneumatic brake system for railway trains, and more particularly to automatic cut-out means which provides for purely pneumatic brake control in case of failure of the electrical control.

In brake installations of the above-mentioned type, a main supply pipe functions, while operating this equipment by electro-pneumatic control, to supply fluid under pressure for charging an auxiliary reservoir and a pneumatic relay located between said auxiliary reservoir and the brake cylinder while a main brake pipe charges the control reservoir and the main piston of the triple valve. A cut-out means, the valve of which is open when the main brake pipe is under pressure, is controlled pneumatically by both the main supply pipe and the service magnet, such that in case of deenergization of the service magnet, either by operation of a push button or by reason of any failure in the electric circuit, the air under pressure in the main pipe can bypass to the pneumatic relay and effect an application of the brakes.

When a service brake application is produced by reason of a failure of one of the magnet valves of the train, it is possible then to return to the purely pneumatic control of the brakes by closing the communication between the main supply pipe and the main pneumatic relay by a cut-out valve means and then effect the brake control in the usual manner by means of reduction in the brake pipe pressure at the engineer's brake valve.

In order to close the cut-out means of a car equipped with the defective magnet valve, it is necessary to vent the main brake pipe. The operator is then obliged to effect further brake operations of the train by the purely pneumatic control which, however, presents many major difficulties. One of these difficulties consists in the sluggishness with which it is possible to apply the purely pneumatic brakes such that the engineer is obliged to consider the much longer braking times and, as a result, the stopping distance of the train becomes much greater than with the electro-pneumatic brake system. Another difficulty equally well known with this type of braking resides in the different degrees of braking between the vehicles located near the control station and those located remotely from this station, this difficulty being manifested by repeated shock action on the cars during application or releasing action of the brakes.

The present invention overcomes all these difficulties and has as its main object an automatic cut-out means which enables, in case of failure of one or even several service magnet valves, the isolation of that or those magnet valves automatically and remotely from the main control station and of further electro-pneumatic brake control on the other vehicles of the train.

To provide this operation, each car in the train is supplied in the well-known manner with a main supply pipe and a brake pipe, a triple valve, a service magnet comprising two valves integral one with the other by means of a stem and which in cooperation with the casing forms three separate chambers, a release magnet valve, a cut-out mechanism comprising a valve which is biased by a return spring to its close position, which separates an upper chamber from a lower chamber of the valve and which, by means of a stem, is attached to a control piston located between two chambers of which the upper chamber is continuously connected to the central chamber of the service magnet valve and the lower chamber of which is continuously connected to the atmosphere, a control reservoir, an auxiliary reservoir, and at least one brake cylinder.

According to the invention, the central chamber of the service magnet valve and the upper chamber of the control piston of the cut-out means are connected to the brake pipe and to the release magnet valve by way of the open valve of the cut-out means, the lower chamber of which is continuously connected to the release magnet, to the brake pipe, and to the lower chamber of the service magnet valve.

Further, according to the invention, the upper chamber of a service magnet valve is connected to atmosphere by means of a calibrated choke which, during a brake application, determines a uniform reduction in the brake pipe and in the upper chamber of the control piston of the cut-out means.

According to another feature of the invention, a calibrated choke is located at the outlet of the upper chamber of the valve of the cut-out valve means. This chamber is connected in a known manner to the control chamber of the service magnet valve, and to the outlet of the upper chamber of the control piston. This chamber is also connected in a known manner to the central chamber of the service magnet valve, this connection including a calibrated choke, the cross section of which is fixed such that when the service magnet valve is deenergized, the drop of pressure in the upper chamber of the control piston follows the reduction in pressure in the brake pipe with a certain delay.

The object of the present invention will be better understood by the following description of two embodiments of my invention given solely as examples and by the attached drawing.

In the accompanying drawing:

FIG. 1 is a diagrammatic view, mainly in section, of an electro-pneumatic brake equipment constructed in accordance with one embodiment of the invention.

Figure 2:
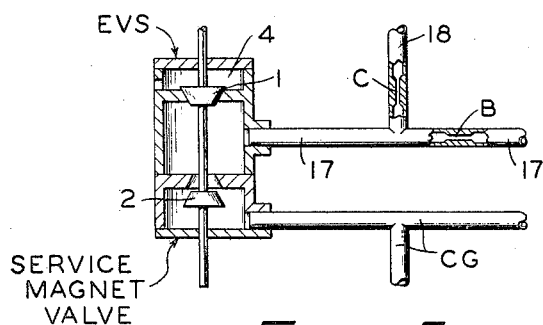

FIG. 2, when taken together with the right-hand portion of FIG. 1, constitutes a modifying form of electro-pneumatic brake equipment constructed in accordance with a second embodiment of the invention.

DESCRIPTION—FIG. 1

In FIG. 1 are shown the brake elements which directly form part of the object of the invention, namely, the service magnet valve and the cut-out valve device together with the suitable pipe connecting these devices to provide for proper operation. The other elements or devices constituting a complete brake equipment for a railway car such as a triple valve, the control reservoir, the auxiliary reservoir, and the brake cylinder device are not shown in FIG. 1, but it should be understood that they are intended to be included to operate in the usual conventional manner.

Referring to FIG. 1, the service or application magnet valve EVS is energized by electrical current supplied via a train wire, as shown, during normal operation of the train and the release magnet valve EVD is energized via a train wire, as shown, only while effecting a release of the brakes. The different elements shown in FIG. 1 of the drawing are located in the position in which they occupy during normal running operation of the train. The service magnet valve EVS comprises a sectionalized casing 19 and two valves 1 and 2 connected together by means of a stem 3. These two valves 1 and 2 control communication between three chambers 4, 5 and 6 formed in the sectionalized casing 19.

The automatic cut-out means D.I. comprises a valve 7 biased by a return spring 8 towards its closed position. The valve 7 is attached by means of a connecting stem 9 to a control piston 10 which normally maintains the valve 7 open.

The valve 7 controls communication between two chambers 11 and 12 located on the opposite sides of valve 7. The control piston 10 has formed on its opposite sides two chambers 13 and 14 which are constantly separated one from the other by a sealing means such as a ring joint of piston ring 15 attached to or carried by piston 10. An O-ring seal 16 disposed about the connecting stem 9 provided a seal about the stem 9 to prevent leakage of fluid under pressure from the chamber 12 along the stem 9 to the chamber 13.

The upper chamber 4 of the service magnet valve EVS is constantly connected to the atmosphere. According to the embodiment of the invention shown in FIG. 1 of the drawing, a calibrated choke A is located at the outlet of the chamber 4 in the service magnet valve EVS.

The central chamber 5 of the service magnet valve EVS is constantly in communication by means of a passageway and pipe 17 with the upper chamber 12 above the valve 7 of the cut-out valve device D.I. and also with the upper chamber 14 above the control piston 10 of the valve 7 by way of the passage 17 and another passageway and pipe 18 branch connected onto said passageway and pipe 17. The lower chamber 6 of the service magnet valve EVS is constantly connected to the brake pipe C.G. and to the lower chamber 11 in which valve 7 of the cut-out means D.I. is disposed which chamber 11 is connected to the release magnet valve EVD by a pipe 20. The release magnet valve EVD is connected by a pipe 21 to the side outlet of a pipe T 22 in the main supply pipe 23 which extends from end to end of each car in a train and is connected to the corresponding pipe on each adjacent car so that fluid under pressure from the main reservoir on the locomotive can be supplied to this pipe extending through the train. The release magnet valve EVD which is energized at the time of effecting a release of the brakes establishes a communication through which fluid under pressure is supplied from the main supply pipe 23 to the brake pipe C.G. via pipe T 22, pipe 21, release magnet valve EVD, pipe 20, and chamber 11.

The chamber 14 above the piston 10 is constantly in communication with the chamber 12 above the valve 7 via pipes and passageways 18 and 17. The chamber 13 below the piston 10 is constantly connected to atmosphere.

As shown in FIG. 1, the return spring 8 acts on valve 7 to bias it towards its corresponding seat in opposition to fluid under pressure in chamber 14 above piston 10. When the fluid under pressure present in the chamber 14 exceeds a value, in the range from 7 to 14 pounds per square inch, it is effective to unseat valve 7 against the bias of spring 8.

OPERATION—FIG. 1

The apparatus shown in FIG. 1 operates in the following manner:

When a service application is initiated by causing the service magnet valve EVS to be deenergized, its lower valve 2 is seated and its upper valve 1 is unseated. The valve 7 of the cut-out means is open and compressed air contained in the brake pipe C.G. escapes to atmosphere by passing through chamber 11, past the unseated valve 7, chamber 12, passageway and pipe 17, central chamber 5 and upper chamber 4 of the service magnet valve EVS, and the choke A.

The pressure is reduced at the same time in the chamber 14 above piston 10 and to the same value as that in the brake pipe C.G. it being understood that the volume of the chamber 14 is less than that of the brake pipe C.G.

The valve 7 of the cut-out means D.I. closes when the pressure in the brake pipe C.G. has attained a relatively low value for which the braking pressure in the brake cylinder has already attained its maximum value and corresponding to that pressure in the upper chamber 14 above the control piston 10 of less force than that exerted by the return spring 8 acting on the valve 7 and through the stem 9 on the piston 10.

When after a service application, service magnet valve EVS is again energized, upper valve 1 is seated cutting off the brake pipe and the cut-out means DI communicating with atmosphere, while its lower valve 2 is open establishing a communication between the chamber 14 above piston 10 and the brake pipe C.G. This chamber is recharged from the brake pipe by way of the open release magnet valve EVD, energized as hereinbefore described, and chamber 11 of the cut-out means D.I. When the pressure in chamber 14 above the control piston 10 becomes preponderant in respect to the force of the return spring 8 acting on the piston 10, the valve 7 of the cut-out means D.I. opens again. After this operation, the system is reset and a repeated deenergization of the magnet valve EVS causes a venting of the brake pipe C.G.

If a failure of the magnet valve EVS occurs by reason of an open circuit in its energizing winding, for example, even in case of normal running of the train, this magnet valve EVS is deenergized. As a result, its upper valve 1 opens and its lower valve 2 closes under the influence of pressure in the brake pipe. The brake pipe C.G. and the chamber 14 above the control piston 10 is then connected to atmosphere by way of the choke A and a continuous leak of air under pressure to the atmosphere is produced. If this leakage is less than normal leakage permitted in the brake pipe as a whole, this leakage is not sufficient to cause a reduction of the pressure in chamber 14 above the piston 10 such that the force of this pressure becomes less than the force exerted by the return spring 8 acting on the piston 10 through the valve 7 and stem 9, and it will not produce a pneumatic service application on the train since the leakage of air is compensated for by the pressure supplied to the brake pipe via the engineer's brake valve.

The electro-pneumatic control of the brakes on other cars of the train can then be normally realized and the brake equipment having the defective magnet valve is cut out from the brake pipe C.G. by way of the cut-out means D.I. unless an emergency brake application is made in which the brake C.G. is vented to the atmosphere. After this operation, the valve 7 of the cut-out means D.I. closes and it is no longer possible to reset the valve 7 of the cut-out means D.I. while the lower valve 2 of the defective service magnet valve EVS remains closed and no pressure can be supplied to the upper face of the control piston 10.

The subsequent control of the brakes on the train is practically not disturbed because the pressure in the brake pipe on a car having the defective magnet valve is sufficiently maintained so that a service application can be realized pneumatically by way of the other brake installation in the train, even after an electric control of the service brake application.

If for some reason, it is desired to return to the purely pneumatic control of braking on the train, it suffices to make an emergency brake application at the brake valve, then interrupt the electric supply to the service line. In this case all the service magnet valves are deenergized and the brake control is purely pneumatic by means of the engineer's brake valve determining the pressure in the brake pipe.

DESCRIPTION—FIG. 2

A second embodiment of the invention is shown fragmentarily in FIG. 2 of the drawing to the extent to which this embodiment differs from the first embodiment of the apparatus shown in FIG. 1.

It will be noted from FIG. 2 that the choke A shown in FIG. 1 is omitted and the chamber 4 of the service magnet valve EVS is open without restriction to atmosphere. It will be further noted from FIG. 2 that in this second embodiment of the invention a first choke B is placed in the pipe 17 between the chamber 12 above valve 7 and the point at which the pipe 18 is connected to the pipe 17, and a second choke C, of smaller capacity than choke B, is placed in the pipe 18 to control the rate of flow of fluid under pressure to and from the chamber 14 above the piston 10, it being noted that the volume of the chamber 10 is comparatively small.

OPERATION—FIG. 2

The normal operation of the brakes is effected in the manner described above for the embodiment of FIG. 1.

When the service magnet valve EVS is deenergized, its upper valve 1 is unseated and its lower valve 2 is closed. The brake pipe C.G. is then connected to the atmosphere by way of chamber 11 (FIG. 1), open valve 7, pipe 17 including the choke B (FIG. 2), the central chamber 5, the upper valve 1 and the upper chamber 4 of the service magnet valve EVS. The chamber 14 located above the control piston 10 of the cut-out means D.I. is also connected to atmosphere by way of the pipe 18, choke C (FIG. 2), and the magnet valve EVS. The drop of pressure in chamber 14 follows the drop of pressure in the brake pipe C.G. with a certain delay which depends on the volume of the chamber 14 and the relation of the area or sizes of the chokes B and C.

The return spring 8 urging the valve 7 of the cut-out means D.I. into its closed position is determined such that the valve 7 can close only when the pressure in the chamber 14 above the piston 10 is reduced to a value lower than 2.5 atmospheres (37 p.s.i.) for example. The valve 7 is then loaded by the return spring 8 such that a maximum service application is made before the valve 7 of the cut-out means D.I. operates and cuts off the communication between the atmosphere and the brake pipe.

When a deenergization of the service magnet valve EVS occurs, for example, by reason of an open circuit in the coil winding of the magnet EVS, its upper valve 1 is open to the atmosphere and its lower valve 2 is closed. By this fact, there is produced a local leak of compressed air contained in the brake pipe C.G. by way of the open valve 7 of the cut-out means D.I. and the upper valve 1 of the service magnet valve EVS. By reason of this leakage, controlled by the size of the choke B, the pressure between this choke B and the central chamber 5 of the service magnet valve EVS possesses an intermediate value between that of atmosphere and that present in the brake pipe C.G. The pressure in chamber 14 located above the control piston 10 reduces also and for a certain degree it becomes lower than the load of the return spring 8 since that the spring 8 closes valve 7 of the cut-out means D.I. In this way, it is possible to obtain pneumatic automatic isolation of the service magnet valve EVS having the defective winding.

The complete cutout of the electro-pneumatic brake and the return to purely pneumatic brake can be controlled at the central post of control. To effect this, the low pressure is effected in the brake pipe C.G. by means of an emergency application or by means of the engineer's brake valve such that the pressure in the brake pipe becomes lower than 2.5 atmospheres and then cut off the charging current to the service magnet train wire. All the service magnet valves of the train are then deenergized and isolated by means of the cut-out means and the train can proceed with purely pneumatic control of application and release of the brakes by operating on the brake pipe by way of the engineer's brake valve.

It is intended that the two embodiments described above only illustrate the invention since modifications can be made to the object of the invention without departing from the scope of the invention as set forth in the appended claims. The object of the invention may as well be applied, for example, to brake installations comprising only the brake pipe, the main supply pipe being eliminated.

Having now described the invention, what I claim as new and desire to secure by Letters Patent, is:

1. An electro-pneumatic brake control equipment for a railway car, comprising:
   (a) a normally charged brake pipe reduction of pressure in which is effective to produce a brake application,
   (b) a normally energized application wire,
   (c) an application magnet valve device connected to said application wire, said application magnet valve device being operable when energized to establish a first fluid pressure communication between a first chamber connected to said brake pipe and a second chamber and operable when deenergized to close said first communication and to establish a restricted communication between said second chamber and atmosphere,
   (d) a normally open cut-out valve device comprising:
      (i) a piston normally subjected on one side to fluid under pressure supplied from said brake pipe via said first communication and on the opposite side to atmospheric pressure,
      (ii) a valve operably connected to said piston for also controlling flow of fluid under pressure from said brake pipe to said second chamber of said application magnet valve device and said one side of said piston, and
      (iii) spring means biasing said valve in one direction to a closed position in opposition to fluid under pressure acting on said one side of said piston to bias said valve in the opposite direction to an open position,
   (f) said application magnet valve device being operable upon deenergization of said application wire to establish said restricted communication whereby fluid under pressure is vented simultaneously from said brake pipe via said open valve and from said one side of said piston to effect a brake application pneumatically, and
   (g) said spring means being effective to close said valve after a predetermined time interval in response to a chosen reduction in pressure on said one side of said piston to terminate further reduction in pressure in said brake pipe thereby insuring an application of brakes to a chosen degree.

2. An electro-pneumatic brake control equipment for each railway car in a train, comprising:
   (a) a normally charged brake pipe reduction of pressure in which is effective to produce a brake application,
   (b) a normally energized application wire,
   (c) an application magnet valve device connected to said application wire, said application magnet valve device being operable when energized to establish a first fluid pressure communication between a first chamber connected to said brake pipe and a second chamber and operable when deenergized to close said first communication and to establish a restricted communication between said second chamber and atmosphere,
   (d) a normally open cut-out valve device comprising:
      (i) a piston normally subjected on one side to fluid under pressure supplied from said brake pipe via said second chamber and on the opposite side to atmospheric pressure,
      (ii) a valve operably connected to said piston for also controlling flow of fluid under pressure from said brake pipe to said second chamber of said application magnet valve device and said one side of said piston, and (iii) spring means biasing said valve in one direction to a closed position in opposition to fluid under pressure acting on said one side of said piston to bias said valve in the opposite direction toward an open position, and (e) said application magnet valve device on said railway car being operable upon deenergization due to the occurrence of a defect therein to establish said restricted communication whereby fluid under pressure is vented simultaneously from said brake pipe via said open valve and from said one side of said piston to render said spring means effective to close said valve to cut off flow of fluid under pressure from said brake pipe to atmosphere via said restricted communication after a predetermined time interval in response to a chosen reduction in pressure on said one side of said piston to terminate further reduction in pressure in said brake pipe, thereby enabling continual electro-pneumatic control of the brakes on the train of railway cars by the application magnet valve devices which remain operative on other cars notwithstanding the defective application magnet valve device on any one of the cars in the train.

3. An electro-pneumatic brake control equipment for each railway car in a train, comprising:

(a) a normally charged brake pipe reduction of pressure in which is effective to produce a brake application, (b) a normally energized application wire, (c) an application magnet valve device connected to said application wire, said application magnet valve device being operable when energized to establish a first fluid pressure communication between a first chamber connected to said brake pipe and a second chamber and operable when deenergized to close said first communication and to establish a restricted communication between said second chamber and atmosphere, (d) a normally open cut-out valve device comprising:
 (i) a piston normally subjected on one side to fluid under pressure supplied from said brake pipe via said second chamber and on the opposite side to atmospheric pressure,
 (ii) a valve operably connected to said piston for also controlling flow of fluid under pressure from said brake pipe to said second chamber of said application magnet valve device and said one side of said piston, and
 (iii) spring means biasing said valve in one direction to a closed position in opposition to fluid under pressure acting on said one side of said piston to bias said valve in the opposite direction toward an open position, (e) said application magnet valve device on said railway car being operable upon deenergization due to the occurrence of a defect therein to establish said restricted communication whereby fluid under pressure is vented simultaneously from said brake pipe via said open valve and from said one side of said piston to render said spring means effective to close said valve after a predetermined time interval in response to a chosen reduction in pressure on said one side of said piston to terminate further reduction in pressure in said brake pipe, (f) a normally charged supply pipe, (g) a normally deenergized release wire, and (h) a release magnet valve device connected to said release wire, said release magnet valve device being operable upon energization of said release wire to establish a fluid pressure communication between said normally charged supply pipe and said brake pipe for charging said brake pipe.

4. An electro-pneumatic brake control equipment for a railway car, comprising:

(a) a normally charged brake pipe reduction of pressure in which is effective to produce a brake application, (b) a normally energized application wire, (c) an application magnet valve device connected to said application wire, said application magnet valve device being operable when energized to establish a first fluid pressure communication between a first chamber connected to said brake pipe and a second chamber and operable when deenergized to close said first communication and to establish a restricted communication between said second chamber and atmosphere, (d) a normally open-cut-out valve device comprising:
 (i) a piston normally subjected one side to fluid under pressure supplied from said brake pipe via said first communication and on the opposite side to atmospheric pressure,
 (ii) a valve operably connected to said piston for also controlling flow of fluid under pressure from said brake pipe to said second chamber of said application magnet valve device and said one side of said piston, and
 (iii) spring means biasing said valve in one direction to a closed position in opposition to fluid under pressure acting on said one side of said piston to bias said valve in the opposite direction toward an open position, (e) said application magnet valve being operable upon deenergization of said application wire to establish said restricted communication whereby fluid under pressure is vented simultaneosly from said brake pipe via said open valve and from said one side of said piston to effect a brake application pneumatically, (f) said spring means being effective to close said valve after a predetermined time interval in response to a chosen reduction in pressure on said one side of said piston to terminate further reduction in pressure in said brake pipe thereby insuring an application of brakes to a chosen degree, and (g) said brake control equipment being operable pneumatically, subsequent to deenergizing said application wire, to effect a brake release and a brake application respectively in response to an increase and a reduction in the pressure in said brake pipe.

5. An electro-pneumatic brake control equipment for a railway car, comprising:

(a) a normally energized application wire, (b) an application magnet valve device connected to said application wire and having a supply chamber, a delivery chamber and an exhaust chamber, (c) a normally open cut-out valve device comprising:
 (i) a casing having a pair of chambers and a counterbore,
 (ii) a piston slidably mounted in said counterbore and cooperating with said casing to form on its respective opposite sides a first chamber which is constantly open to atmosphere and a second chamber,
 (iii) a valve operably connected to said piston for controlling flow from one of said pair of chambers to the other of said pair of chambers, and
 (iv) spring means biasing said valve in one direction to a closed position, (d) conduit means connecting said other of said pair of chambers and said second chamber in said cut-out valve device with said delivery chamber in said application magnet valve device, and (e) a normally charged brake pipe connected to said one chamber of said pair of chambers in said cut-out valve device and said supply chamber in said application magnet valve device whereby, upon deenergization of said application wire, said application magnet valve device operates to establish a first charging communication through which fluid under pressure flows from said brake pipe to said second chamber in said cut-out valve device to cause said piston to open said valve against the yielding resistance of said spring means thereby establishing a second charging communication parallel to said first charging communication through which fluid under pressure flows from said brake pipe to said second chamber in said cut-out valve device, and (f) the deenergization of said application wire being effective to cause said application magnet valve device to close said first charging communication and establish a communication between said delivery chamber and said exhaust chamber through which communication fluid under pressure is vented from said brake pipe and said second chamber in said cut-out valve device to atmosphere until said biasing means is rendered effective to cut off flow from the one of said pair of chambers to the other of said pair of chambers upon a predetermined reduction of pressure in said brake pipe and in said second chamber thereby insuring a reduction in the pressure in said brake pipe that is adequate to cause a pneumatic service application of the brakes.

6. An electro-pneumatic brake control equipment for a railway car, comprising:

(a) a normally energized application wire,
(b) an application magnet valve device connected to said application wire and having a supply chamber, a delivery chamber and an exhaust chamber,
(c) a normally open cut-out valve device comprising:
 (i) a casing having a pair of chambers and a counterbore,
 (ii) a piston slidably mounted in said counterbore and cooperating with said casing to form on its respective opposite sides a first chamber which is constantly open to atmosphere and a second chamber,
 (iii) a valve operably connected to said piston for controlling flow from one of said pair of chambers to the other of said pair of chambers, and
 (iv) spring means biasing said valve in one direction to a closed position,
(d) conduit means connecting said other of said pair of chambers and said second chamber in said cut-out valve device with said delivery chamber in said application magnet valve device,
(e) a normally charged brake pipe connected to said one chamber of said pair of chambers in said cut-out valve device and said supply chamber in said application magnet valve device whereby, upon energization of said application wire, said application magnet valve device operates to establish a first charging communication through which fluid under pressure flows from said brake pipe to said second chamber in said cut-out valve device to cause said piston to open said valve against the yielding resistance of said spring means thereby establishing a second charging communication parallel to said first charging communication through which fluid under pressure flows from said brake pipe to said second chamber in said cut-out valve device, (f) the deenergization of said application wire being effective to cause said application magnet valve device to close said first charging communication and establish a communication between said delivery chamber and said exhaust chamber through which communication fluid under pressure is vented from said brake pipe and said second chamber in said cut-out valve device to atmosphere until said biasing means is rendered effective to close said valve to cut off flow from the one of said pair of chambers to the other of said pair of chambers upon a predetermined reduction of pressure in said brake pipe and in said second chamber thereby insuring a reduction in the pressure in said brake pipe that is adequate to cause a pneumatic service application of the brakes, (g) a normally charged train supply pipe,
(h) a normally deenergized release wire, and
(i) a release magnet valve device connected to said release wire and being operable when energized to establish a communication between said normally charged train supply pipe and said brake pipe for effecting local charging of said brake pipe on each car in a train only during the releasing period of brakes while said release wire is energized.

7. An electro-pneumatic brake control equipment for a railway car, as claimed in claim 5, further characterized by a choke means for controlling the venting of fluid under pressure from said exhaust chamber of said application magnet valve device whereby the flow of fluid under pressure from said brake pipe and said second chamber in said cut-out valve device to atmosphere is at the same restricted rate until said spring means is rendered effective to close said valve to terminate flow of fluid under pressure from said brake pipe to atmosphere.

8. An electro-pneumatic brake control equipment for a railway car, as claimed in claim 5, further characterized in that a first choke means is disposed in said conduit means for controlling venting of fluid under pressure from said second chamber in said cut-out valve device to atmosphere at one restricted rate, and in that a second choke means is disposed in said conduit means for controlling only the venting of said brake pipe via said pair of chambers in said cut-out valve device so long as said valve is held open by said piston to atmosphere at a second restricted rate that is greater than said one restricted rate.

No references cited.

EUGENE G. BOTZ, *Primary Examiner.*